J. M. SELDEN.
KITCHEN UTENSIL.
APPLICATION FILED MAY 21, 1914.
1,123,019.
Patented Dec. 29, 1914.
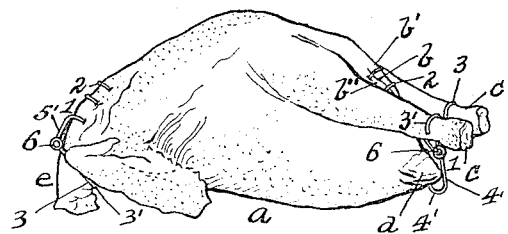
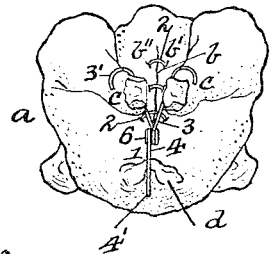
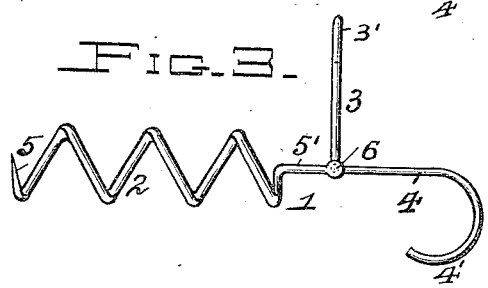
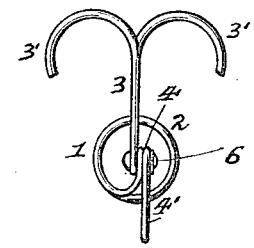
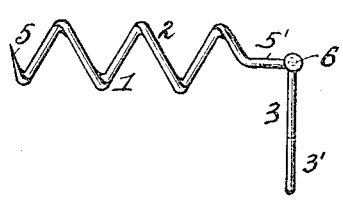
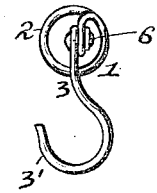
Witnesses:
Inventor:
James M. Selden,
By J. W. Cooke
Attorney.

UNITED STATES PATENT OFFICE.

JAMES M. SELDEN, OF CRAFTON, PENNSYLVANIA.

KITCHEN UTENSIL.

1,123,019.  Specification of Letters Patent.  Patented Dec. 29, 1914.

Application filed May 21, 1914. Serial No. 840,139.

*To all whom it may concern:*

Be it known that I, JAMES M. SELDEN, citizen of the United States, and a resident of Crafton, in the county of Allegheny and State of Pennsylvania, have invented a new and useful Improvement in Kitchen Utensils; and I do hereby declare the following to be a full, clear, and exact description thereof.

My invention relates to kitchen utensils, and has special reference to such devices for use in connection with the cooking of fowls, birds, etc.

The object of my invention is to provide a cheap, simple and efficient device for use in the roasting or baking of fowls, birds, etc., when the same are filled with dressing, which will do away with the usual sewing up of the fowl, will hold the fowl in proper shape while roasting or baking, and can easily and quickly be removed from the fowl when desired.

My invention consists, generally stated, in the novel arrangement, construction and combination of parts, as hereinafter more specifically set forth and described and particularly pointed out in the claims.

To enable others skilled in the art to which my invention appertains to construct and use my improved kitchen utensil, I will describe the same more fully, referring to the accompanying drawing, in which:

Figure 1 is a side view of a fowl ready for cooking, showing my improved kitchen utensil applied thereto. Fig. 2 is an end view of the same. Fig. 3 is a side view of the utensil. Fig. 4 is an end view of the same. Fig. 5 is a view of another form of my utensil. Fig. 6 is an end view of the same.

Like symbols of reference herein indicate like parts in each of the figures of the drawing.

As illustrated in the drawing, 1 represents my improved kitchen utensil which is preferably formed of wire and bent to shape to form the spiral portion or member 2, legs supporting portions or members 3 and tail supporting portion or member 4.

At one end of the spiral portion 2 is the sharp pointed end 5, and the opposite end of the same is provided with the horizontal portion 5' which is connected with said spiral and has the supporting members 3 and 4 pivoted thereto by means of the pivot pin 6. These members 3 and 4 are each provided with the hook portions 3' and 4' respectively, and the members 3 are substantially in lines parallel with each other and are adapted to be raised and lowered on the pivot pin 6, while the member 4 is also adapted to be raised and lowered on said pin.

The use and operation of my improved kitchen utensil is as follows:—After the fowl *a* has been slit or cut open in the usual manner and at the usual point to form the usual opening *b* the entrails are removed and the usual stuffing or dressing placed within such fowl through said opening. After this is done, the pointed end 5 of the spiral member 2 on the utensil 1 is placed through one edge *b'* of one of the sides forming the opening *b* in the fowl *a* and at the rear edge of such opening, and then said end 5 is passed through the other edge *b''* on the opposite side, so that by rotating said utensil by the operator turning the members 2 and 3 through said members acting as a handle, the spiral member 2 will be forced along the opening *b* in the fowl and close the same by drawing the edges *b'* and *b''* of the same together through such end 5 being passed through said edges when such edges are placed over said end. After this is done, the members 3 can be raised on their pivot 6 and the legs *c* of the fowl *a* placed under the same, after which the member 4 can be lowered on said pivot and placed under the tail *d* of the fowl, which will prevent the member 2 from being withdrawn from the sides of the opening *b* and hold the legs *c* down, thereby anchoring the utensil. It will thus be seen that my improved kitchen utensil when in use will hold the fowl in its proper form and shape for roasting or baking so as to obtain all the best results possible in being properly cooked, while it will also hold the legs of the fowl down to the body proper, which will thereby hold the cooked fowl to its proper form and shape, and will also allow the cooking of the fowl to be obtained in a smaller space than under ordinary circumstances. It will also be obvious that the objectionable and usually hard operation of tying together of the legs and sewing up the fowl after the insertion of the dressing will be overcome, while the usual interference of the threads, the cutting of the same, and the liability of serving the same when serving the fowl and its dressing are overcome, and the fowl thus is presented in an attractive and appetizing condition for serving and eating.

In Fig. 3 my improved kitchen utensil 1 is shown in shape for use in holding the usual slitted opening together at the head of the fowl and in such form, a single pivoted member 3 can be used, which, when the utensil 1 is in position with the spiral member 2 closing such opening, can be swung around the neck $e$ of the fowl and thus act as a handle in inserting and withdrawing the member 2 in and from the sides of the opening and in anchoring the utensil and assisting with the utensil at the rear of the fowl in holding such fowl in proper form and shape.

Various other modifications and changes in the design and construction of my improved kitchen utensil may be resorted to without departing from the spirit of the invention or sacrificing any of its advantages.

What I claim as my invention and desire to secure by Letters Patent is:

1. A device of the character described for preparing fowls for cooking, comprising means for engaging the body of the fowl, and upwardly extending open hook members pivoted to said means.

2. A device of the character described for preparing fowls for cooking, comprising means for engaging the body of the fowl, and a downwardly extending open hook member pivoted to said means.

3. A device of the character described for preparing fowls for cooking, comprising means for engaging the body of the fowl, and downwardly and upwardly extending open hook members pivoted to said means.

In testimony whereof, I, the said JAMES M. SELDEN, have hereunto set my hand.

JAMES M. SELDEN.

Witnesses:
T. B. HUMPHRIES,
J. N. COOKE.

Copies of this patent may be obtained for five cents each, by addressing the "Commissioner of Patents, Washington, D. C."